United States Patent

Platnic

[11] Patent Number: 6,049,474
[45] Date of Patent: Apr. 11, 2000

[54] CURRENT ESTIMATOR FOR A THREE PHASE INVERTOR WITH PWM PERIOD ADJUSTMENT

[75] Inventor: Michel Platnic, Cagnes-sur-mer, France

[73] Assignee: Texas Instruments Incorporated, Dallas, Tex.

[21] Appl. No.: 08/903,110

[22] Filed: Jul. 30, 1997

[30] Foreign Application Priority Data

Jul. 30, 1996 [FR] France ................................. 96 09597

[51] Int. Cl.$^7$ .............................. H02M 3/24; H02M 7/44
[52] U.S. Cl. .............................................. 363/98; 363/132
[58] Field of Search ................... 363/36, 37, 41, 363/98, 132; 318/811

[56] References Cited

U.S. PATENT DOCUMENTS

| | | | |
|---|---|---|---|
| 4,788,485 | 11/1988 | Kawagishi et al. | 318/811 |
| 4,870,556 | 9/1989 | Inaba et al. | 363/41 |
| 5,163,172 | 11/1992 | Hakala | 363/37 |
| 5,309,349 | 5/1994 | Kwan . | |
| 5,449,990 | 9/1995 | Bowling et al. | 318/607 |
| 5,729,449 | 3/1998 | Takada et al. | 363/98 |
| 5,757,636 | 5/1998 | Fletcher | 363/98 |

FOREIGN PATENT DOCUMENTS 0 370 254 5/1990 European Pat. Off. .

*Primary Examiner*—Stuart N. Hecker
*Attorney, Agent, or Firm*—William B. Kempler; Richard L. Donaldson

[57] ABSTRACT

Method of control of a three-phase or multi-three-phase invertor (1) supplied from a DC voltage source (2) and controlled by a processor (5) for deriving, in the course of successive slaving periods, signals for pulse-width-modulation control of the transistors of the invertor. It consists, from measuring the power supply current of the invertor and from taking account of the switching states of the transistors, in reconstituting the phase currents. When, within a PWM period, a time interval (u1, u2) between the instant of switching of a transistor of one phase and the instant of switching of a corresponding transistor of a following phase becomes less than a predetermined threshold value, preventing the measurement, a PWM is generated defining a measurement time interval, of sufficient duration to allow measurement of the effects of the switching on the line current, and the duration of the other PWMs of the same slaving period is reduced, by a value such that the sum of the reductions of these other PWMs compensates for the increase in the PWM defining the measurement interval.

17 Claims, 3 Drawing Sheets

6,049,474

CURRENT ESTIMATOR FOR A THREE PHASE INVERTOR WITH PWM PERIOD ADJUSTMENT

BACKGROUND OF THE INVENTION

The present invention concerns the control of invertors, and relates more particularly the control of three-phase or multi-three-phase invertors.

In order to control a three-phase motor efficiently, it is necessary to use a control algorithm which employs three-phase currents.

In most invertor systems, information relating to the phase currents is necessary.

A first known method of obtaining these currents consists in detecting them directly, but this needs at least two sensors applied directly to the phases of the motor, depending on the connections of the windings of the motor. These types of sensors are usually expensive because of their sophisticated nature and the need to isolate them.

Another way which is also known is to detect only the line current and measure the three phase currents on the basis of this line current. This second method needs a simple inexpensive resistor as sensor and does not need to be isolated.

Since the switching state of the invertor is controlled directly, using a digital signal processor, it is possible to ascertain the exact electrical path taken by the input current through the invertor to each phase.

The phase currents can then be linked directly with the line currents. The phase currents which are obtained are due to an actual detection of the current, and are not the result of a simulation which needs a model of the output circuit. The means of estimation is therefore fully independent of the input and output circuits of the invertor.

The phase currents are estimated on the basis of the line direct current, as a function of the state of the invertor.

Under certain conditions, the time difference between two states of the invertor is very small. In this case, because of the switching time of the transistors involved in the construction of the invertor, the presence of a dead band, and the response delays of the electronic processing circuits the phase signal is invisible on the line current which is processed. As a consequence, no current measurement is possible during this period.

A known method gives a solution for overcoming this limitation due to the circuit and for making an estimate of the current with better precision in a wider range of loads and speeds than the methods described above allow.

An invertor generally includes three pairs of switching elements, for example transistors, the emitter-collector paths of the transistors in each pair being connected in series to the terminals of a DC voltage source.

The bases of the transistors of each pair are connected to the pulse-width-modulation control outputs of a processor and respectively receive a switching signal and its complement. The connections between the transistors in each pair are each connected to a phase winding of the motor to be controlled.

The following situation will be considered. In order to represent the switching state of an invertor, a switching function Sa is defined for a phase A as follows: Sa=1 when the upper transistor of the phase A is on, and Sa=0 when the lower transistor of the phase A is on, and the upper transistor is off.

Similar definitions can be given for the phases B and C.

The signals Sa, Sb, Sc controlling the lower transistors are the opposites of the signals Sa, Sb, Sc with a dead band being added.

The term dead band is used to denote the time difference between the switching of the upper and lower transistors of the same phase. The two transistors of each phase are never on at the same time. The purpose of the dead band is to protect the energy devices supplied by the invertor during the switching, by avoiding on-state overlaps and consequently high transient currents.

The stator current can then be expressed as a function of the switching states of the transistors of the invertor, idc=ia when (Sa, Sb, Sc)=(1,0,0)
idc=−ia when (Sa, Sb, Sc)=(0,1,1)
idc=ib when (Sa, Sb, Sc)=(0,1,0)
idc=−ib when (Sa, Sb, Sc)=(1,0,1)
idc=ic when (Sa, Sb, Sc)=(0,0,1)
idc=−ic when (Sa, Sb, Sc)=(1,1,0)
idc=0 when (Sa, Sb, Sc)=(1,1,1)
idc=0 when (Sa, Sb, Sc)=(0,0,0)

By using the equations mentioned above as a basis, a phase current can be related to the DC line current. In consequence, three phase currents can be measured by considering only the line in direct current.

If the pulse-width-modulation frequency is high enough, the phase current changes only slightly over one or two pulse-width-modulation periods. A measured phase current thus gives a reasonable approximation of the true current.

For example, when an interrupt 1 takes place, the state of the invertor is (0,0,1) and the phase current measured is ic=idc. After interrupt 2, the sample current will be determined by (1,0,1), so that ib=−idc.

One way of phase current reconstruction consists in generating a configuration for a control cycle time lasting 250 µs, for example. The line current is then sampled every 15.6 µs and sorted according to the switching state to update a stack containing the estimated phase current. With the samples obtained, an average is processed to determine each estimated phase current.

Given that the sampling takes place with fixed time, some small configurations, less than 30 µs, may be undetected. In order to remedy these undetectable signals, a zero duty cycle will be used for the first pulse-width modulation and the theoretical pulse-width modulation will be accumulated for the duty cycle of the following period of the same vector. This process continues until the accumulated duty cycle exceeds 30 µs.

Given that the samples are not synchronized with the states of the invertor, a large minimum duty cycle (here 30 µs) is needed in order to make the line current coincide with the appropriate state.

Let U1 be the time interval between the switching of a transistor of a first phase, from the start of a pulse-width-modulation period, and the switching of a corresponding transistor of a following phase.

Let U2 be the time interval between the instant of switching of a transistor of the following phase and the switching of the corresponding transistor of the remaining phase.

Under certain conditions, U1 or U2 are very small and, because of the switching time of the transistors, the presence of a dead band and response delays of the electronic processing circuits, the phase signal is invisible in the line current.

SUMMARY OF THE INVENTION

The object of the invention is to overcome this drawback by creating a control method for a three-phase motor, which is of the type defined above and which is virtually insensitive to the reduction of the switching time intervals between the transistors of the successive phases of the invertor.

The invention therefore relates to a method of control of a three-phase or multi-three-phase invertor comprising switching means linking the outputs to a DC voltage source, the invertor being controlled by means for deriving, in the course of successive slaving cycles, signals for pulse-width-modulation control of the switching means on the basis of the phase currents obtained according to preceding measurements of the power supply line current of the invertor, characterized in that, when, within a pulse-width-modulation period, a time interval between the instant of switching of a switching means of one phase and the instant of switching of a corresponding switching means of a following phase becomes less than a predetermined threshold value, preventing the measurement, it consists in generating a pulse-width modulation defining a measurement time interval of sufficient duration to allow measurement of the effects of the said switching on the line current and in reducing the duration of the other pulse-width modulations, contained in the same slaving cycle, by a value such that the sum of the reductions of these other pulse-width modulations compensates for the increase in the pulse-width modulation defining the said measurement interval.

According to another characteristic of the invention, the reduction in the duration of the other pulse-width modulations is obtained by defining a compensation interval related to the corresponding measurement interval by the respective relations:

(n−1) compensation U1+measurement U1=n U1
(n−1) compensation U2+measurement U2=n U2 in which
n is the integer number of pulse-width-modulation periods per slaving cycle.

The invention also relates to a device for control of a three-phase or multi-three-phase invertor comprising switching means linking the outputs of the invertor to a DC voltage source, the invertor being controlled by means for deriving, in the course of successive slaving cycles, signals for pulse-width-modulation control of the switching means on the basis of the phase currents obtained according to preceding measurements of the power supply line current of the invertor, characterized in that the means for deriving the control signals comprise means for generating a pulse-width modulation defining a measurement time interval, of sufficient duration to allow measurement of the effects of the said switching on the line current when, within one pulse-width-modulation period, a time interval between the instant of switching of a switching means of one phase and the instant of switching of a corresponding switching means of a following phase becomes less than a predetermined threshold value, preventing the measurement, and means for reducing the duration of the other pulse-width modulations, which are contained in the same slaving cycle, by a value such that the sum of the reductions in these other pulse-width modulations compensates for the increase in the pulse-width modulation defining the said measurement interval.

According to one characteristic of the invention, the means for reducing the duration of the other pulse-width modulations comprise means defining a compensation interval related to the corresponding measurement interval by the respective relations:

(n−1) compensation U1+measurement U1=n U1
(n−1) compensation U2+measurement U2=n U2 in which
n is the integer number of pulse-width-modulation periods per slaving cycle.

BRIEF DESCRIPTION OF THE DRAWINGS

The invention will be understood more clearly from reading the following description, given solely by way of example and made with reference to the appended drawings, in which.

DETAILED DESCRIPTION OF THE INVENTION

Figure 1:
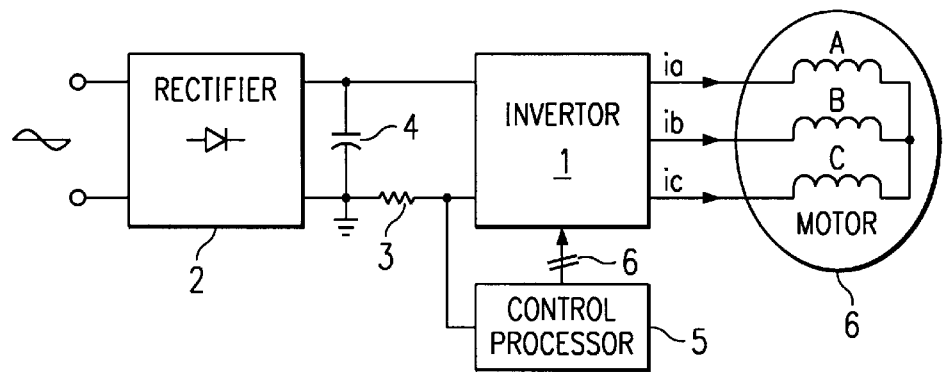
FIG. 1 is a block diagram of a three-phase motor control device employing the method of the invention.

FIG. 1 shows the block diagram of a three-phase motor control device including an invertor 1 connected to the output terminals of a rectifier 2 via a line resistor 3.

The rectifier 2 is supplied by the AC mains.

A capacitor 4 is connected in parallel on the output of the rectifier upstream of the line resistor 3.

The device furthermore includes an invertor control processor 5 which has a measurement input linked to the line resistor 3 and is connected to the invertor by six control lines for the switching elements of the invertor, in a manner described with reference to FIG. 2.

The invertor 1 is linked by its outputs to the stator windings of the three phases A, B and C of a three-phase electric motor 6 and delivers currents ia, ib, ic to these three phases.

Figure 2:
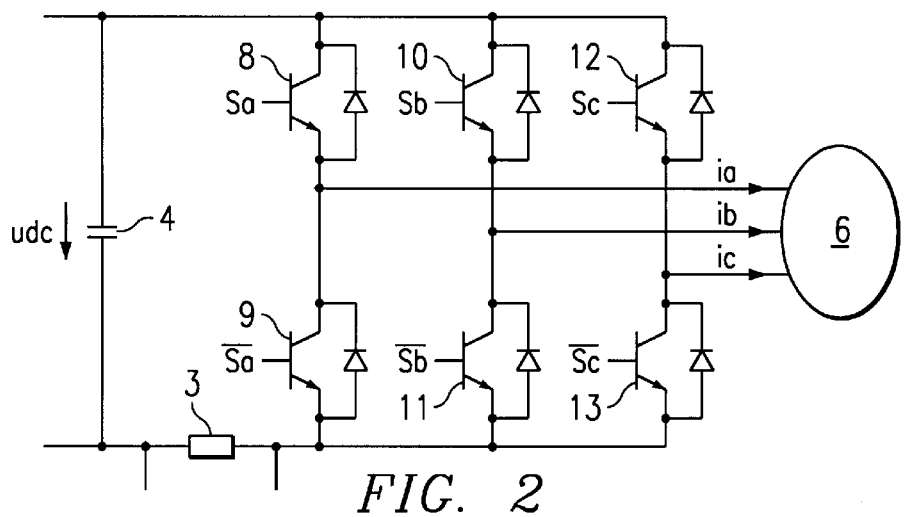
FIG. 2 is a circuit diagram of an invertor to which the invention is applied.

The invertor 1 represented schematically in FIG. 2 includes three pairs of switching elements, such as transistors 8, 9, 10 11, 12, 13.

The emitter-collector paths of the transistors in each pair are connected in series to the terminals of the output of the rectifier 2, which delivers a DC voltage Udc.

The bases of the transistors of each pair are connected to corresponding outputs of the processor 5, which advantageously consists of a digital signal processor DSP and which delivers switching signals Sa, Sb, Sc to the upper transistors 8, 10, 12 of the respective pairs of transistors and complementary switching signals Sa, Sb, Sc to the lower transistors 9, 11, 13.

The connections between the upper and lower transistors of the respective pairs form the outputs of the invertor which are connected to the electric motor and deliver the currents ia, ib, ic respectively.

As already indicated, the electric motor 6 is controlled by alternating currents phase-shifted by $3\pi/2$, formed from pulse-width-modulation signals calculated and generated by the processor 5 on the basis of the line current measured on the resistor 3 of the circuit in FIG. 1, as well as phase currents measured during preceding slaving periods.

The widths of the successive pulse-width-modulation signals of each phase control the corresponding switchings of the switching elements of the invertor 1.

Given that, when the time intervals U1and U2 between the switching of a transistor of one phase and the switching of a corresponding transistor of the phase which follows it are too small, it is not possible to take measurements, the idea is to generate a greater time interval when it is desired to take this measurement and to compensate by generating shorter pulse-width modulations during the remaining time of a given slaving or control cycle.

For exampler it is assumed that there is a control cycle time of 400 μs. The pulse-width modulation has a carrier frequency of 12.5 kHz.

During a control cycle, n=5 similar patterns of 80 μs are generated. In the present case, the circuit sets a minimum time of 4 μs between two consecutive switching states in order to detect a measurement. If the case is taken in which, for a given speed and at a given load, the control algorithm calculates, at an instant t, differences between the pulse-width modulations equal respectively to U1=12 μs and U2=1.5 μs, the first time difference will allow a current measurement but the second will not In order to make it possible to take measurements at any moment, the method according to the invention consists in setting the minimum measurement time set by the chosen circuit to the small time value, here U2.

U2 would thus be modified as U2 measurement=4 μs.

This artificial modification of certain pulse-width modulations may result in a different energy applied to the motor and to an inappropriate direction of the stator field.

Given that more energy than necessary is applied to the motor, the efficiency is reduced.

Similarly, generating an inappropriate flux entails torque fluctuations.

In most control devices, the frequency of the main control cycle is less than the pulse-width-modulation frequency.

The control device generates a plurality of similar pulse-width-modulation patterns with a single update of the phase currents.

In order to remedy these drawbacks and apply the theoretical phase signals calculated by the control device to the motor, the idea is therefore to set a minimum duration for the various PWM patterns, depending on whether or not a measurement is desired.

During the measurements, the pulse signals are adapted to correspond with the minimum time criteria set by the circuits, whereas during the remaining time, in which no measurement is taken; these signals are compensated in order to generate the same energy in the motor on average.

Returning to the example above, five similar patterns are calculated during a single control cycle. During the measurement interval, U2 is equal to U2 measurement=4 μs is and U1 remains equal to 12 μs.

The other four patterns compensate for an excess energy generated by this measurement pattern by having a compensation delay U2 given by the relation:

Compensation 4U2+measurement U2=5U2 compensation U2=measurement 5U2−U2/4 compensation U2=5×1.5−4/4=0.875 μs

Of course, if the interval of insufficient value is U1, the same relation as the one applied to U2 is also applied to U1.

Furthermore, if the number of patterns per slaving cycle is different from 5, the relations (n−1)× compensation U1+measurement U1=n×U1 and (n−1)× compensation U2+measurement U2=n×U2 are also applied for calculating the corresponding compensation and measurement intervals.

Figure 5:
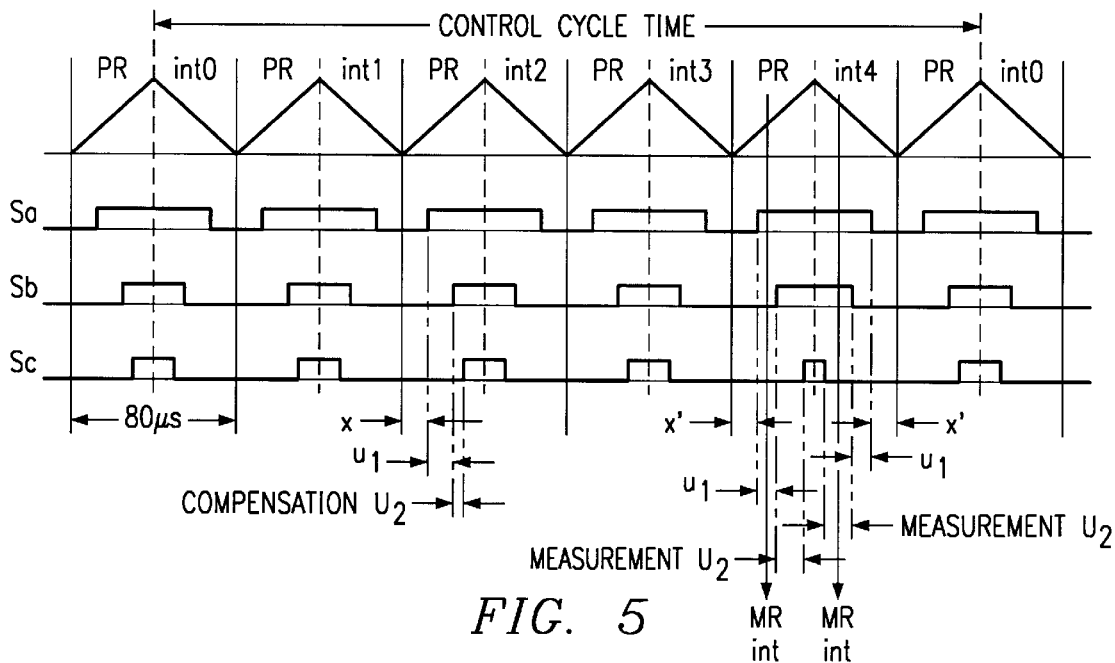
FIG. 5 is a synchronization diagram of the control signals delivered by the device of the invention using symmetrical synchronization signals.

In order to generate coded-pulse modulation, use is made of a sychronization signal generated by the DSP 5 which, according to a first embodiment, successively counts up and down, as represented on the diagram in FIG. 5.

At the end of each counting mode, an interrupt PRint occurs.

Each time the main program of the processor introduces the interrupt, a count is incremented.

By increasing this variable, the main program calculates the control signal once every n=5 PWM periods.

The interrupt PRint generates the compensation pattern and the measurement pattern when this is necessary.

The interrupt PRint is enabled when a measurement pattern is delivered by the processor.

The interrupt PRint starts a conversion and causes the measurement to be stored in the memory of the DSP 5.

The signals resulting from this synchronization are represented in FIG. 5, below the sawtooth synchronization signal.

Figure 4:
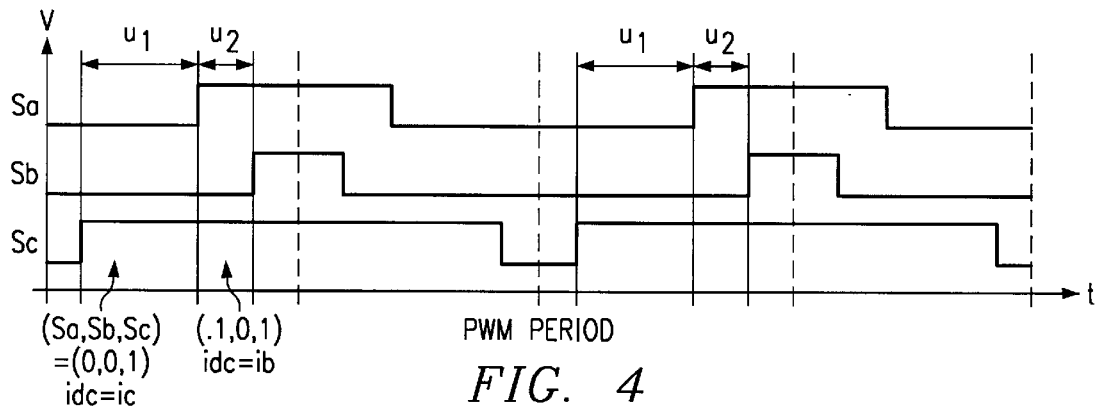
FIG. 4 is a diagram as a function of time of symmetrical signals controlling the upper transistors of the invertor in FIG. 2.

These signals are the three control pulse-width-modulation signals Sa, Sb, Sc of the three phases of the motors, which are represented partially and on an enlarged scale in FIG. 4.

In the present example, there are five signals generated by the DSP 5 during a control or slaving cycle.

The signals are symmetrical with respect to the peaks of the synchronization signals.

They may also be asymmetric, as will be described with reference to FIG. 5a.

The signal Sa is the widest and defines an interval× between the start of a synchronization signal and its leading edge, on the one hand, and its trailing edge and the end of the synchronization signal, on the other hand.

The signal Sb, which is narrower than the signal Sa, defines the interval U1 between the leading is and trailing edges of the signals Sa and Sb. The signal Sc, which is even narrower, defines the interval U2 between the leading and trailing edges of the signals Sb and Sc.

In the absence of the compensation according to the inventions U1 and U2 are the same for all the signals of a control cycle, as is represented on an enlarged scale in FIG. 4.

In consequence, if U1 or U2 become too narrow to take a measurement, an indeterminacy is generated on the corresponding signal.

FIG. 5 shows that, during the fifth synchronization signal, the pulse-width-modulation signals Sa, Sb and Sc are modified in width to make it possible to obtain a measurement interval measurement U2 of a sufficient duration to allow a measurement, whereas an interval U2 not processed by the method of the invention would be too narrow.

This is obtained by widening the PWM signals Sa and Sb and by contracting the signal Sc.

In order to compensate for the modification of the energy of the signal delivered to the electric motor as a result of this increase in U2, the other four signals Sc are widened, which leads to the generation of contracted compensation U2 intervals, the sum of which with the measurement interval is equal to the sum of the unprocessed intervals U2.

In the case of producing a symmetrical pulse-width modulation PWM, the first half-period of a PWM is constructed with the state (0,0,0) given by the state equations of the functions Sa, Sb, Sc which are defined above.

It is then constructed with two states in which at least one of the upper transistors 8, 10, 12 (FIG. 2) is on and one of the lower transistors 9, 11, 13 is on (U1 and U2), and finally with the state (1,1,1).

The second half-period has the same sequence but reversed in time.

Since it is not possible to take any measurement during the states (0,0,0) and (1,1,1), two current measurements can be taken, one during an interval U1 and the other during an interval U2. The currents measured during the intervals U1 and U2 belong to different phases.

In the case of a star structure for the stator of the electric motor to be controlled, the third current can be deduced from the relation:

$$ia+ib+ic=0$$

Figure 3:
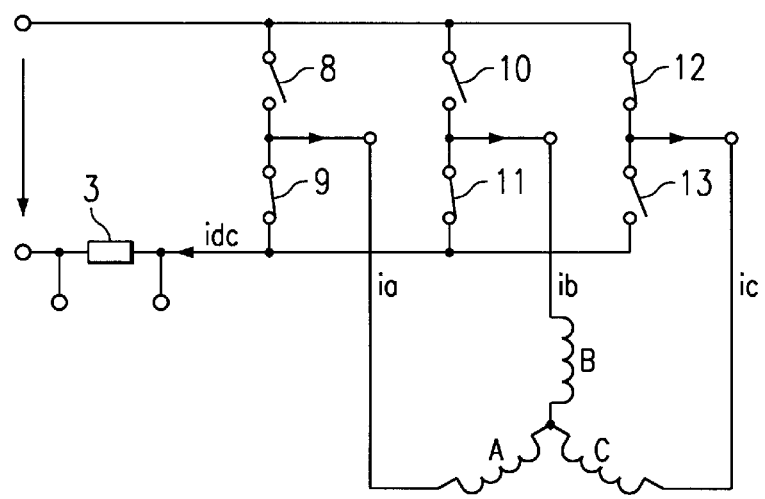
FIG. 3 is an equivalent circuit diagram of an invertor supplying three star-connected windings of an electric motor stator.

In the aforementioned example, the state of the invertor 1 (FIG. 3) is (0,0,1) during the interval U1.

The phase current measured is then idc=ic. During the interval U2, the sample current is determined by (1,0,1). In consequence, idc=−ib; ib and ic are therefore determined, and ia=−(ib+ic).

Figure 5A:
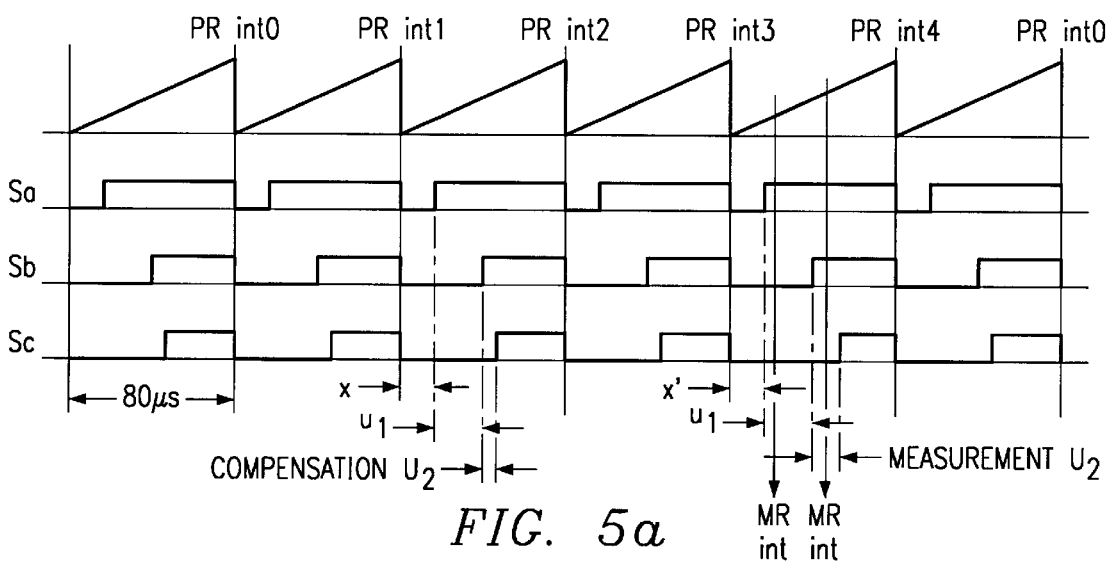
FIG. 5a is a synchronization diagram of the control signals delivered by the device of the invention, using asymmetric synchronization signals.

FIG. 5a represents a diagram similar to the one in FIG. 5, but in which the control signals of the transistors of the invertor are asymmetric.

This figure shows that the synchronization signal is a sawtooth signal generated by successive counting periods, and that the signals Sa, Sb and Sc are synchronized with the vertical trailing edges of the sawtooth signals.

At the end of each count, an interrupt PRint is produced.

As in the example described with reference to FIG. 5, an interrupt PRint is enabled when a measurement pattern is delivered by the processor.

In the present example, the interval measurement U2 is produced during the fifth period of the sawtooth synchronization signal.

In this case, the signal Sa defines a single interval× between the start of a synchronization signal and its leading edge.

The signal Sb, which is narrower than the signal Sa, defines the interval U1 between the leading edge of the signal Sa and its own leading edge.

The signal Sc, which is even narrower, defines the interval U2 between the leading edge of the signal Sb and its own leading edge.

As in the diagram in FIG. 5, the PWM signals Sa, Sb, Sc are modified in width during the fifth synchronization signal in order to make it possible to obtain a measurement signal measurement U2 of sufficient duration.

The contracted compensation intervals U2 generated during the other four synchronization signals provide the necessary energy compensation.

Figure 6:
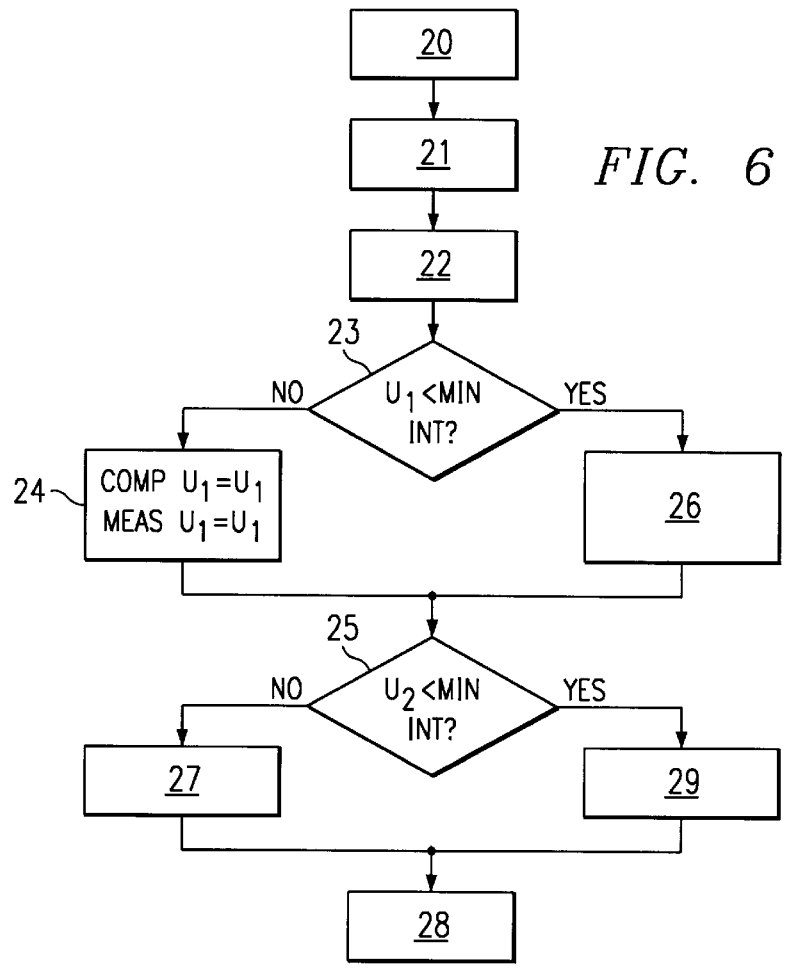
FIG. 6 is an operational flowchart of the processor of the control device for implementing the method according to the invention.

The operation of the device according to the invention will be explained clearly with reference to the flowchart in FIG. 6.

Using the main program 20 stored in memory in the DSP, in step 21 there is a waiting period for the control flag to change to 1.

Then during step 22, the intervals U1 and U2 and the PWM patterns are calculated.

During step 23, the relation U1<minimum interval is tested.

If the response is negative, a confirmation is made during step 24 that the interval U1 can be the measurement interval and the compensation interval, and then the step 25 is carried out of testing the relation U2<minimum interval.

If the response to the question asked in step 23 is positive, then during step 26 the measurement and compensation intervals measurement U1 and compensation U2 are calculated from the relations:

comp. U1=[5U1−min. int]/4 mes. U1=min.int

Then the step 25 is also carried out of testing the relation U2<minimum interval.

If the response to the question asked is no, then during step 27 it is confirmed that the interval U2 can be the measurement interval and the compensation interval, and during step 28 the main program for deriving the PWM signals is returned to.

If the response is yes, then in step 29 the measurement and compensation intervals are calculated from the relations:

Comp. U2=[5U2−min.int]/4 mes. U2=min.int

Then, during step 28, the main program for deriving the PWM signals is returned to.

Figure 7:
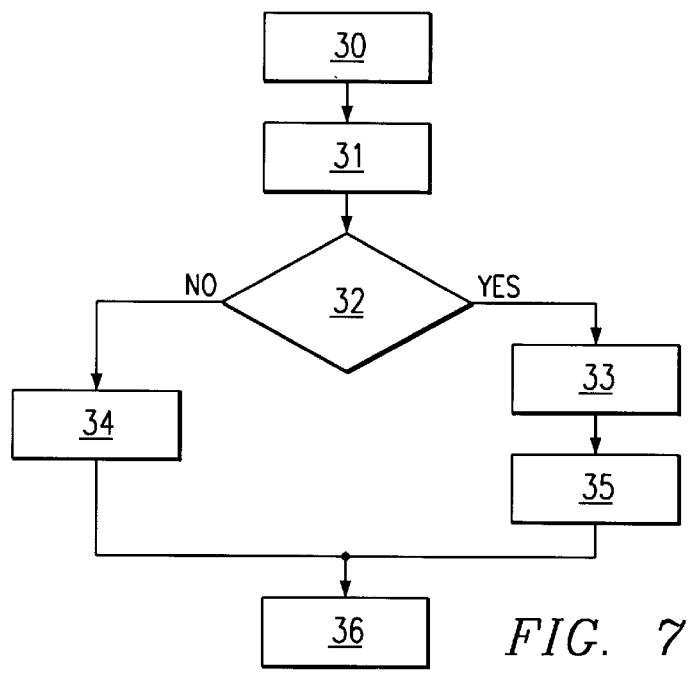
FIG. 7 is a flowchart for derivation of instructions needed for executing the flowchart in FIG. 6.

FIG. 7 represents the flowchart for deriving the PWM patterns during a control or slaving period and for measuring the line current.

During the step 30, the DSP generates an interrupt period PRint which occurs at the end of the counting mode.

This step is followed by a control step 31 for a flag of incrementation by 1 modulo 5.

During the step 32, the question is asked whether the flag control is equal to 4.

If the response is yes, a measurement pattern is produced and applied during step 33. The PWMs are updated at the end of the countdown mode.

If the response is no, a compensated pattern is applied during the phase 34.

During the application of the measurement pattern, during step 35 the measurement interrupts PRint established as a function of the measurement pattern are enabled and applied.

During this step, the e phase currents are deduced from the two measurements taken on the line current.

After steps 34 or 35, the main program is returned to during step 36.

The advantages of the present solution are as follows:

If the performances of the two methods indicated above are compared for an asynchronous motor with two pairs of poles rated at 450 W, at a speed of 150 rpm with an empty drum as load and a 270 V voltage supply, this speed and this load represent an unfavourable case for the circuit defined above.

The maximum time interval ΔPWM between two switching states which can be detected because of the limitations of the circuit is 2.8 $\mu$s in the example described above.

It is now assumed that an energy has been generated within the motor corresponding to $u_n$ with n∈[1,2] equal to 2.8 $\mu$s during 400 $\mu$s.

In the method of the invention, which is referred to as the "compensated solution", it will be possible to measure the current during each control cycle by generating the pattern with measurement $u_n$=2.8 $\mu$s and four other patterns with compensation $u_n$0. In order to keep the same ratio for the two methods (they have different control cycle times), the energy corresponding to 2.8 $\mu$s over 400 $\mu$s is 1.75 $\mu$s over 250 $\mu$s. The sampling speed of the two methods for this small value of load and rate is as follows.

In order to acquire a sample, the conventional method needs to have a minimum duty cycle of 30 $\mu$s.

In order to obtain the performance described above, the register must accumulate (abs(30/1.75)+1=) 18 times the energy over 250 μs. The control will therefore acquire a sample every 18×250 μs=4.5 ms.

Under the same conditions, the "compensated" solution according to the invention will obtain a sample every 400 μs.

The sampling rate is therefore 10 times greater in the solution of the invention.

The circuit used in this case has a dead band of 1.2 μs, but it is already possible for some invertors with a higher range of speeds to switch off in less than 150 ns and have control elements capable of generating a dead band of 200 ns. It therefore seems possible, with existing devices, to achieve a ΔPWN equal to less than 500 ns. The performance of the "compensated" solution are enhanced in the same ratio compared to the conventional solution.

All these calculations were carried out for a particular application.

The numbers and the ratios given above may differ greatly for another application, but in any case, the results of the estimate according to the invention remain more accurate than those of the conventional solution.

The method according to the invention is a synchronous method, so that all algorithms can be used with a constant time base, this constituting the basis of all control algorithms.

This method provides continuous control for low speed and low load, and consequently better efficiency.

Since it is known exactly when to obtain the correct sample coinciding with the corresponding current, there is no need to sample several times and take an average in order to obtain the phase current. In order to obtain the final measured current, it is not necessary to process an average over the samples or to filter in order to reduce the locking effects of erroneous times. A significant saving is therefore made in the calculation time for measuring the currents.

The method of the invention makes it possible to control a motor in a very wide range of speeds and loads, with ten times better performance than conventional methods.

The torque and speed control performance can be enhanced by using efficient control algorithms for the price of a solution which has poorer performance. All devices for controlling synchronous and asynchronous motors, or in general all three-phase invertors, can now use this method to estimate the phase currents Although, in the example described above, the invention is applied to the control of a three-phase electric motor, and consequently that of a three-phase invertor, it can be applied equally well to the control of a multi-three-phase invertor in which the groups of three phases are processed in the same way as those of a three-phase invertor.

I claim:

1. Method of control of a three-phase or multi-three-phase invertor (1) comprising switching means (8,9,10,11,12,13) linking the outputs of the invertor to a DC voltage source (2), the invertor being controlled by means (5) for deriving, in the course of successive slaving cycles, signals for pulse-width-modulation control of the switching means on the basis of the phase currents obtained according to the preceding measurements of the power supply line current of the invertor, wherein within a pulse-width-modulation period, a time interval (u1, u2) between the instant of switching of a switching means of one phase and the instant of switching of a corresponding switching means of a following phase becomes less than a predetermined threshold value, preventing the measurement, it consists in generating a pulse-width modulation defining a measurement time interval (measurement u1; measurement u2) of sufficient duration to allow measurement of the effects of the said switching on the line current and in reducing the duration of the other pulse-width modulations, contained in the same slaving cycle, by a value such that the sum of the reductions of these other pulse-width modulations compensates for the increase in the pulse-width modulation defining the said measurement interval.

2. Method according to claim 1, wherein the reduction in the duration of the other pulse-width modulations is obtained by defining a compensation interval (compensation u1; compensation u2) related to the corresponding measurement interval (measurement u1, measurement u2) by the respective relations:

(n−1) compensation u1+measurement u1=n u1

(n−1) compensation u2+measurement u2=n u2 in which n is the integer number of pulse-width modulations periods per slaving cycle.

3. Method according to claim 2, wherein the means for deriving the pulse-width-modulation control signals comprise a processor (5) containing a program for implementing the method.

4. Method according to claim 3, wherein the processor (5) is a digital signal processor (DSP).

5. Method according to claim 3, wherein the derivation of the measurement intervals (measurement u1, measurement u2) and of the compensation intervals (compensation u1, compensation u2) is carried out on the basis of a signal for synchronization of the pulse-width modulations of the three phase currents, derived by the processor (5), the said synchronization signal being obtained by successive counting modes and defining interrupt periods (PRint) at the end of the successive counting modes, and two measurement interrupts (MRint) in the course of a period of the synchronization signal.

6. Method according to claim 1, wherein the means for deriving the pulse-width-modulation control signals comprise a processor (5) containing a program for implementing the method.

7. Method according to claim 3, wherein the processor (5) is a digital signal processor (DSP).

8. Method according to claim 7, wherein the derivation of the measurement intervals (measurement u1, measurement u2) and of the compensation intervals (compensation u1, compensation u2) is carried out on the basis of a signal for synchronization of the pulse-width modulations of the three phase currents, derived by the processor (5), the said synchronization signal being obtained by successive counting modes and defining interrupt periods (PRint) at the end of the successive counting modes, and two measurement interrupts (MRint) in the course of a period of the synchronization signal.

9. Method according to claim 8, wherein the successive counting modes include counting modes and countdown modes in turn.

10. Method according to claim 6, wherein the derivation of the measurement intervals (measurement u1, measurement u2) and of the compensation intervals (compensation u1, compensation u2) is carried out on the basis of a signal for synchronization of the pulse-width modulations of the three phase currents, derived by the processor (5), the said synchronization signal being obtained by successive counting modes and defining interrupt periods (PRint) at the end of the successive counting modes, and two measurement interrupts (MRint) in the course of a period of the synchronization signal.

11. Method according to claim 10, wherein the successive counting modes include counting modes and countdown modes in turn.

12. Device for control of a three-phase invertor (1) comprising switching means (8,9,10,11,12,13) linking the outputs of the invertor to a DC voltage source (2), the invertor being combined with means (5) for deriving, in the course of successive slaving cycles, signals for pulse-width-modulation control of the switching means on the basis of the phase currents obtained according to preceding measurements of the power supply lines current of the invertor, wherein the means for deriving the control signals comprise means for generating a pulse-width modulation defining a measurement time interval (measurement u1; measurement u2), of sufficient duration to allow measurement of the effects of the said switching on the line current when, within one pulse-width modulation period, a time interval (u1, u2) between the instant of switching of a switching means of one phase and the instant of switching of a corresponding switching means of a following phase becomes less than a predetermined threshold value, preventing the measurement, and means for reducing the duration of the other pulse-width modulations, which are contained in the same slaving cycle, by a value such that the sum of the reductions in these other pulse-width modulations compensates for the increase in the pulse-width modulation defining the said measurement interval.

13. Device according to claim 12, wherein the means for deriving the pulse-width modulation control signals comprise a processor (5) containing a program for implementing the method.

14. Device according to claim 13, wherein the processor (5) is a digital signal processor (DSP).

15. Device according to claim 12, wherein the means for reducing the duration of the other pulse-width modulations comprise means defining a compensation interval (compensation u1, compensation u2) related to the corresponding measurement interval (measurement u1, measurement u2) by the respective relations:

(n−1) compensation u1+measurement u1=n u1

(n−1) compensation u2+measurement u2=n u2 in which n is the integer number of pulse-width modulation periods per slaving cycle.

16. Device according to claim 15, wherein the means for deriving the pulse-width modulation control signals comprise a processor (5) containing a program for implementing the method.

17. Device according to claim 16, wherein the processor (5) is a digital signal processor (DSP).

* * * * *